United States Patent
Pistoia et al.

(10) Patent No.: US 11,556,830 B2
(45) Date of Patent: Jan. 17, 2023

(54) EFFICIENT QUADRATIC ISING HAMILTONIAN GENERATION WITH QUBIT REDUCTION

(71) Applicant: International Business Machines Corporation, Armonk, NY (US)

(72) Inventors: Marco Pistoia, Amawalk, NY (US); Rahul Sarkar, Palo Alto, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 691 days.

(21) Appl. No.: 16/688,748

(22) Filed: Nov. 19, 2019

(65) Prior Publication Data
US 2021/0150400 A1 May 20, 2021

(51) Int. Cl.
*G06N 10/00* (2022.01)
*G06F 15/16* (2006.01)
(Continued)

(52) U.S. Cl.
CPC ............. *G06N 10/00* (2019.01); *G06F 15/16* (2013.01); *G06N 5/003* (2013.01); *G06N 7/005* (2013.01)

(58) Field of Classification Search
CPC ........ G06F 15/16; G06N 10/00; G06N 5/003; G06N 7/005
See application file for complete search history.

(56) References Cited

U.S. PATENT DOCUMENTS

| 10,282,674 B2 | 5/2019 | Adachi et al. |
| 2003/0055513 A1 | 3/2003 | Raussendorf et al. |

(Continued)

OTHER PUBLICATIONS

Feld et al., "Quantum Technology and Optimization Problems" ISBN 9783030140816.
(Continued)

*Primary Examiner* — Terrell S Johnson
(74) *Attorney, Agent, or Firm* — Amin, Turocy & Watson, LLP

(57) ABSTRACT

Systems and methods that address an optimized method in the area of optimization by showing how to generate Ising Hamiltonians automatically for a large class of optimization problems specially handling the constraints. The innovation facilitates qubit reduction in connection with an optimization problem by representing respective integer variables as linear sums of binary variables, wherein depending on the representation, additional equality constraints are provided. Additional slack variables are introduced to change inequality constraints to equality constraints. Based on the equality constraints, an unconstrained pseudo-boolean optimization problem is created. The pseudo-boolean optimization problem is quadratized to generate a quadratic pseudo-boolean function (QPBF) and the number of variables in the QPBF is reduced to facilitate qubit reduction. This results in an automated, problem instance dependent qubit reduction procedure. Thus, this innovation provides an effective method to solve such class of optimization problems by formulating efficient Ising Hamiltonians for integer optimization problems followed by an automated qubit reduction procedure to get the final Ising Hamiltonian, which can be solved using a quantum optimization algorithm.

20 Claims, 9 Drawing Sheets

(51) Int. Cl.
*G06N 7/00* (2006.01)
*G06N 5/00* (2006.01)

(56) References Cited

U.S. PATENT DOCUMENTS

| | | |
|---|---|---|
| 2012/0045136 A1 | 2/2012 | Rose |
| 2012/0215821 A1* | 8/2012 | Macready ............ B82Y 10/00 708/1 |
| 2017/0344898 A1* | 11/2017 | Karimi .................. G06N 10/00 |
| 2018/0053112 A1* | 2/2018 | Bravyi .................. G06N 10/00 |
| 2018/0165595 A1 | 6/2018 | Ahn |
| 2018/0300286 A1 | 10/2018 | Raymond |
| 2019/0228333 A1 | 7/2019 | Bravyi et al. |

OTHER PUBLICATIONS

Wang, et al., Accelerated Variational Quantum Eigensolver, Phys. Rev. Lett. 122, 140504.

Farhi et al., A Quantum Approximate Optimization Algorithm, arxiv: 1411.4028.

Pyqubo—Integer, https://pyqubo.readthedocs.io/en/latest/reference/integer.html, Accessed on Jun. 17, 2019.

Ishikawa, H., 2010. Transformation of general binary MRF minimization to the first-order case IEEE transactions on pattern analysis and machine intelligence, 33(6), pp. 1234-1249.

Freedman, D. and Drineas, P., Jun. 2005. Energy minimization via graph cuts: Settling what is possible. In 2005 IEEE Computer Society Conference on Computer Vision and Pattern Recognition (CVPR'05) (vol. 2, pp. 939-946). IEEE.

Boros, E., Hammer, P.L. and Tavares, G., 2006. Preprocessing of unconstrained quadratic binary optimization.

Rother, C., Kolmogorov, V., Lempitsky, V. and Szummer, M., Jun. 2007. Optimizing binary MRFs via extended roof duality. In 2007 IEEE Conference on Computer Vision and Pattern Recognition (pp. 1-8). IEEE.

U.S. Appl. No. 16/356,608, filed Mar. 18, 2019. "Automatic generation of Ising Hamiltonian for solving optimization problems in quantum computing".

U.S. Appl. No. 16/248,278, filed Jan. 15, 2019. "System & Method to solve Mixed Integer Problems on a quantum computer".

\* cited by examiner

EFFICIENT QUADRATIC ISING HAMILTONIAN GENERATION WITH QUBIT REDUCTION

TECHNICAL FIELD

The subject disclosure relates generally to system(s) and method(s) that formulate efficient Ising Hamiltonians for integer optimization problem(s) and automate qubit reduction procedure(s) for solving problem(s) using quantum optimization algorithm(s).

SUMMARY

The following presents a summary to provide a basic understanding of one or more embodiments of the invention. This summary is not intended to identify key or critical elements, delineate scope of particular embodiments or scope of claims. Its sole purpose is to present concepts in a simplified form as a prelude to the more detailed description that is presented later. In one or more embodiments described herein, systems, computer-implemented methods, apparatus and/or computer program products facilitate generation of efficient Ising Hamiltonians for integer optimization problems and automate a qubit reduction procedure for Ising Hamiltonians to be solved using quantum optimization algorithms.

In accordance to an embodiment, a system, comprises: a memory that stores computer-executable components; a classical processor, operably coupled to the memory that executes the computer-executable components, wherein the computer-executable components comprise: a formulation component that structures an optimization problem as a quadratic pseudo-boolean optimization problem; a quadratization component that quadratizes the pseudo-boolean optimization problem so as to generate an equivalent first quadratic pseudo-boolean function (QPBF) to optimize; and an optimization component that reduces number of variables in the first QPBF using at least one of a roof duality or extended roof duality technique to obtain a second QPBF with fewer number of boolean variables than the first QPBF.

In accordance with an embodiment, a computer implemented method, comprises: using a classical processor to execute computer executable components stored in memory to perform the following acts:
using the classical processor to structure an optimization problem as a quadratic pseudo-boolean optimization problem; using the classical processor to Quadratizes the quadratic pseudo-boolean optimization problem to reduce number of additional variables used to solve the optimization problem so as to generate an equivalent first quadratic pseudo-boolean function (QPBF) to optimize; and using the classical processor to reduce number of variables in the first QPBF using at least one of a roof duality or extended roof duality technique to obtain a second QPBF with fewer number of boolean variables than the first QPBF.

DETAILED DESCRIPTION

Figure 1:
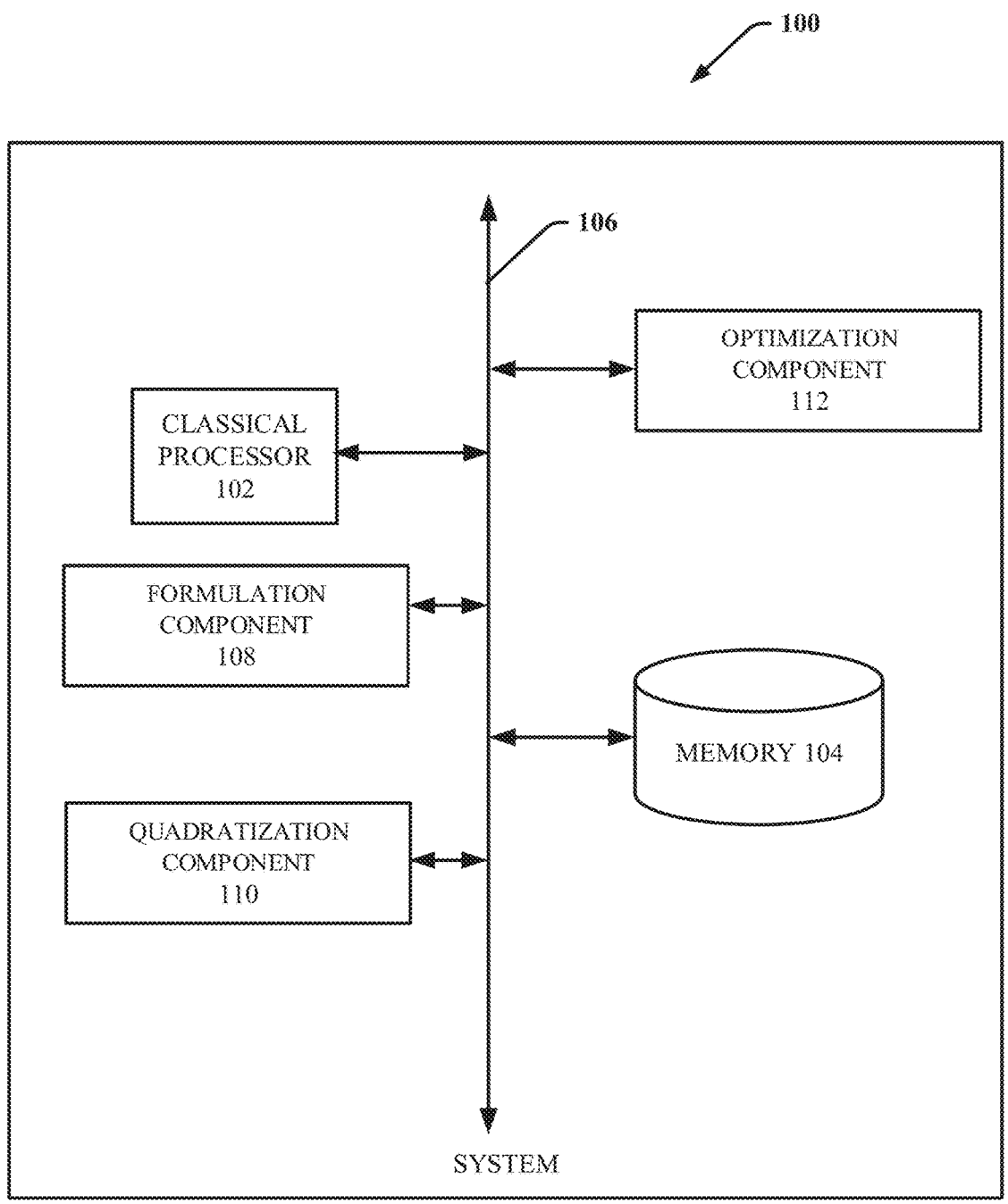
FIG. 1 illustrates a block diagram of an example system implemented that can function as efficient Quadratic Ising Hamiltonian generation with qubit reduction.

The following detailed description is merely illustrative and is not intended to limit embodiments and/or application or uses of embodiments. Furthermore, there is no intention to be bound by any expressed or implied information presented in the preceding Summary section, or in the Detailed Description section. One or more embodiments are now described with reference to the drawings, wherein like reference numerals are used to refer to like elements throughout. In the following description, for purposes of explanation, numerous specific details are set forth in order to provide a more thorough understanding of the one or more embodiments. It is evident; however, in various cases, that the one or more embodiments can be practiced without these specific details.

Embodiments described and claimed herein enhance solving optimization problems via a quantum computer by showing how to generate Ising Hamiltonians automatically for a large class of optimization problems specially handling the constraints. In order to perform quantum optimization, there are three significant characteristics that should be supported: (i) support for both equality and inequality constraints; (ii) support for variables that can take values in both contiguous and non-contiguous finite sets of integers; and (iii) enablement of qubit reduction procedure which is extremely important for near term quantum computers which have a limited number of qubits. Overall, these features allow for more scalable optimization and applicability to a wide range of problems, such as computer vision applications (e.g., image segmentation, texture recognition, etc.). Embodiments facilitate qubit reduction in connection with an optimization problem by representing respective integer variables as linear sums of binary variables, wherein depending on the representation, additional equality constraints are provided. Additional slack variables are introduced to change inequality constraints to equality constraints. Based on the equality constraints, an unconstrained pseudo-boolean optimization problem is created. The pseudo-boolean optimization problem is quadratized to generate a quadratic pseudo-boolean function (QPBF) and the number of variables in the QPBF is reduced to facilitate qubit reduction. This results in an automated, problem-instance-dependent qubit reduction procedure. Thus, embodiments facilitate solving such class of optimization problems by formulating efficient Ising Hamiltonians for integer optimization problems followed by an automated qubit-reduction procedure, which can be solved using a quantum optimization algorithm.

In today's digital world, the use of modern computers has increased exponentially. Due to the enormous number of advances in micro processing power over the past decade, the number of transistors that can be incorporated onto an integrated circuit is doubled. This type of analogy was first spotted by what is referred as Moore's Law. In this law, the number of transistors in a dense integrated circuit doubles about every two years. The results obtained from this law has transformed technology into a trillion-dollar industry. Through this methodology, powerful chips can be found in everything from home computers to autonomous cars to smart household devices. However, due to physics limitations of how densely logic gates can be packed on a computer chip, Moore's Law may not be able to go on indefinitely. There are physical limitations to have the ability to continually shrink the size of components on a chip and hence a fundamentally new computing paradigm is needed to get around this problem. Thus, as an essential primitive, quantum computing is receiving more and more attention today.

Quantum computing is generally the use of quantum-mechanical phenomena for the purpose of performing computing and information processing functions. Quantum computing can be viewed in contrast to classical computing, which generally operates on binary values with transistors. Classical computers can operate on bit values that are either 0 or 1. Almost any device with two distinct states can serve to represent a classical bit: a switch, a valve, a magnet, a coin. Quantum computers, on the other hand, operate on quantum bits that comprise superpositions of both 0 and 1, can entangle multiple quantum bits, and use interference. Superconducting qubits offer a promising path toward constructing fully-operational quantum computers as it can exhibit quantum-mechanical behavior (allowing to be used for quantum information processing) at a macroscopic level (e.g., allowing to be designed and fabricated by existing integrated circuit technologies). A quantum computer uses a qubit as its essential unit instead of a classical computing bit. The qubit is the quantum-mechanical analogue of the classical bit. Whereas classical bits can take on only one of two basis states (e.g., 0 or 1), qubits can take on superpositions of these basis states (e.g., $\alpha|0\rangle + \beta|1\rangle$) where $\alpha$ and $\beta$ are complex scalars such that $|\alpha|^2 + |\beta|^2 = 1$), allowing a number of qubits to theoretically hold exponentially more information than the same number of classical bits. It's not that the qubit can have an intermediate value, such as 0.63; when the state of the qubit is measured, the result is always 0 or 1. But in the course of a computation a qubit can act as if it were a mixture of states—say, 63 percent 0 and 37 percent 1. Thus, quantum computers (e.g., computers that employ qubits instead of solely classical bits) can, in theory, quickly solve some problems that would be extremely difficult for classical computers.

By processing information using the laws of quantum mechanics, quantum computers offer novel ways to perform computation tasks such as molecular calculations, financial risk calculations, optimization and many more. General quantum programs require coordination of quantum and classical parts of the computation. One way to think about general quantum programs is to identify their processes and abstractions involved in specifying a quantum algorithm, transforming the algorithm into executable form, running an experiment or simulation, and analyzing the results. A notion throughout these processes is use of intermediate representations. An intermediate representation (IR) of a computation is neither its source language description, nor the target machine instructions, but something in between. Compilers may use several IRs during a process of translating and optimizing a program. The input is source code describing a quantum algorithm and compile time parameter(s). The output is a combined quantum/classical program expressed using a high level IR. A distinction between quantum and classical computers is that a quantum computer is probabilistic, thus these measurements of algorithmic outputs provide a proper solution within an algorithm specific confidence interval. The computation is then repeated until a satisfactory probable certainty of solution can be achieved.

In the optimization world, many integer programming problems involve both equality and inequality constraints. For instance, a traveling salesperson problem contains both equality and inequality constraints when posed as a discrete optimization problem. Other examples such as a job shop scheduling problem, knapsack problem and subset sum problem can also be posed as an optimization problem involving equality and inequality constraints. In some problems, integer variables can take values in non-contiguous set(s) of integers. For instance, in a semi-continuous integer variables scenario, there are variables that can take either a value of zero, or integer values between some upper and lower bounds. Such variables are typically used to model situations, where a certain variable may either not be used or when used can be in a specific range. For example, in a typical airline company, suppose the company desires to decide whether to fly a plane on a route or not. For the endeavor to be profitable, the company ends up deciding to fly the plane only if there are at least 10 passengers. In this situation, if the maximum capacity of the plane is 100, then revenue collected by the airline is either zero (e.g., if the plane does not fly) or ticket price multiplied by N, where N is an integer between 10-100 and N represents the number of passengers.

Moreover, there are many computer vision problems such as image segmentation, texture recognition, super resolution/view synthesis where the use of binary Markov random fields (MRFs) are used. MRFs are also known as pseudo-boolean functions in the discrete optimization literature. Historically a restricted class of MRFs were considered, for example, pairwise interactions only, which lead to quadratic pseudo-boolean optimization problems with some exception where triple interactions were considered. This restriction was imposed because of a difficulty of minimizing higher order pseudo-boolean functions. Quadratic reductions of higher order problems were also in general avoided, because the reductions often led to non-submodular optimization but natural scenes are often too rich to be well captured by nearest neighbor interactions. An ability to optimize such higher order MRFs thus has potential applications in computer vision. Thus, in these embodiments, a technique is described to formulate efficient Ising Hamiltonians for this class of integer optimization problems, followed by an automated qubit reduction procedure, which can then be solved using quantum optimization algorithms.

In these embodiments, an efficient method is recognized for Quadratic Ising Hamiltonian generation for a class of integer optimization problems. The method comprises representing respective integer variable as linear sums of binary variables, wherein depending on the representation, additional equality constraints are provided. Additional slack variables are introduced to change the inequality constraints to equality constraints. Based on the equality constraints, an unconstrained pseudo-boolean optimization problem is created. The pseudo-boolean optimization problem is quadratized to generate a Quadratic Pseudo-Boolean Function (QPBF) and the number of variables in the QPBF is reduced to generate the final QPBF for quantum optimization. This allows for significant reduction in the number of qubits where an Ising Hamiltonian is involved. These embodiments are specific to quantum computations with Ising Hamiltonians, which occur when dealing with optimization problems. These embodiments enhance state of the art in optimization by showing how to generate Ising Hamiltonians automatically for a large class of optimization problems. A novelty of such embodiments is to handle polynomial inequality constraints, integer variables with values from potentially non-contiguous finite subsets of integers, polynomial constraints and polynomial cost functions. The procedure to formulate optimization problems with polynomial constraints and polynomial objective function as Ising Hamiltonian and recognizing that quadratization techniques can be applied to reduce pseudo-boolean functions to QPBFs, in the specific context of quantum optimization, are significant contributions to these embodiments. Additionally, reducing number of variables in an optimization problem using roof duality and extended roof duality techniques, before solving the problem using quantum optimization algorithm, lowers qubit requirement costs. Thus, embodiments described as claimed herein improve usability of a quantum computing software stack in quantum optimization to quickly experiment with a quantum computer by generating the Ising Hamiltonian for an optimization problem automatically.

FIG. 1 illustrates a block diagram of an example system 100 that can access data and process that data using variable computing components depicted in accordance with one or more embodiments described herein. The system 100 can facilitate a process of assessing and identifying a large amount of various forms of data. The system 100 can also generate predictive recommendations to an individual level resulting in a context in accordance with one or more embodiments described herein. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. Repetitive description of like elements employed in one or more embodiments described herein is omitted for sake of brevity.

System 100 can optionally include a server device, one or more networks and one or more devices (not shown). The system 100 can also include or otherwise be associated with at least one processor 102 that executes computer executable components stored in memory 104. The system 100 can further include a system bus 106 that can couple various components including, but not limited to, a formulation component 108 that structures an optimization problem as a quadratic pseudo-boolean optimization problem; a quadratization component 110 that quadratizes the pseudo-boolean optimization problem so as to generate an equivalent first quadratic pseudo-boolean function (QPBF) to optimize; and an optimization component 112 that involves running a polynomial time algorithm to determine optimal values of a subset of the variables to result in qubit reduction.

System 100 can be any suitable computing device or set of computing devices that can be communicatively coupled to devices, non-limiting examples of which can include, but are not limited to, a server computer, a computer, a mobile computer, a mainframe computer, an automated testing system, a network storage device, a communication device, a web server device, a network switching device, a network routing device, a gateway device, a network hub device, a network bridge device, a control system, or any other suitable computing device. A device can be any device that can communicate information with the systems 100 and/or any other suitable device that can employ information provided by system 100. It is to be appreciated that systems 100, components, models or devices can be equipped with communication components (not shown) that enable communication between the system, components, models, devices, etc. over one or more networks.

In accordance with the system 100, a memory 104 can store computer executable components executable by the processor 102. The formulation component 108 can structure an optimization problem as a pseudo-boolean optimization problem by representing integers as linear sums of binary variables, introduce slack variables to change inequality to equality constraints and create an unconstrained pseudo-boolean optimization problem. The quadratization component 110 quadratizes the pseudo-boolean problem and minimizes the number of extra variables used. The optimization component 112 can reduce the number of variables in the new quadratic pseudo-boolean function (QPBF). As previously stated, the functionality of the components utilized by the embodiments will be covered in detail in this document.

The various components of systems 100 can be connected either directly or via one or more networks. Such networks can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, or any other suitable communication technology. Moreover, the aforementioned systems and/or devices have been described with respect to interaction between several components. It may be appreciated that such systems and components can include these components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

The subject computer processing systems, methods apparatuses and/or computer program products can be employed to solve new problems that arise through advancements in technology, computer networks, the Internet and the like.

A quantum-mechanical system, many-body or single-body, is defined by two basic objects: a Hilbert space, and a Hamiltonian acting on it. A Hilbert space is a vector space that has an inner product which is a way of taking two vectors and producing a scalar in C. A Hamiltonian is a linear self-adjoint operator H which takes V to itself such that it maps respective elements of V to some other element of V. The usual physicist notation for this is that H takes $|v\rangle$ to $H|v\rangle=|Hv\rangle$. The linearity is an essential property of quantum mechanics and can be articulated as $H(|v1\rangle+|v2\rangle)=H|v1\rangle+H|v2\rangle$. The Hamiltonian is represented as a matrix whose elements are given by:

$$H_{ji}=\langle i|H|j\rangle$$

so that the action of H on a state in this basis is a matrix whose entries are $H_{ij}$. Namely, the $i^{th}$ component of the vector $|Hv\rangle$ in this basis is given by:

$$\langle i|Hv\rangle = \langle i|H|v\rangle = \sum_j H_{ij}\langle j|v\rangle$$

In quantum mechanics, a potts model is used as a lattice where a vertex is assigned a spin. This model is designed to show behavior in ferromagnets where the spins interact with its nearest neighbors. The edges represent pairs of particles which interact. A quantum mechanical operator is associated with the respective measurement observable, and the operator associated with the system energy is called Hamiltonian. Thus, the Hamiltonian corresponds to the energy of a system where the system energy can be expressed as the sum of kinetic energy and potential energy. The lowest energy states exist where majority of the spins are in the same direction. This can be represented in the equation below:

$$h(\omega) = -J \sum_{(i,j)\in E(G)} \delta(\sigma_i, \sigma_j)$$

where $\omega$ is a state of graph G, $\sigma i$ is the spin at vertex i, $\delta$ is a Kronecker delta function and J is interaction energy. This measures number of pairings between vertices with same spins, weighted by interaction energy. A basic Ising model can be used to illustrate a magnetic material. In a lattice graph this can be represented with a classical spin at respective sites, aligned either up or down: $\sigma \in \{+1, -1\}$ and in quantum mechanics would be $\sigma \in \{+\frac{1}{2}, -\frac{1}{2}\}$. The spins interact with one another via a coupling of strength J and to an external applied magnetic field B. The spin interactions are:

| +1 | +1 | = J
| -1 | +1 | = -J
| +1 | -1 | = -J
| -1 | -1 | = J

Figure 2:
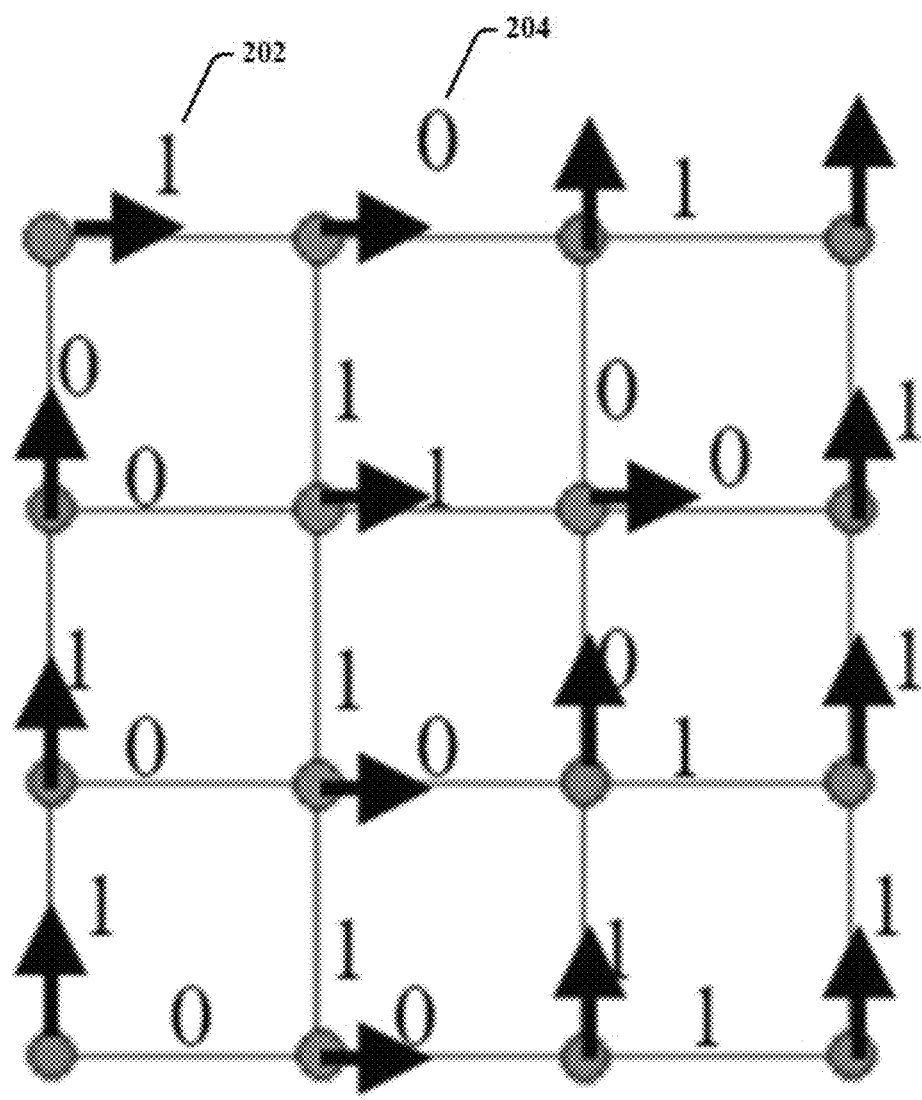
FIG. 2 illustrates an example Ising model in a lattice graph where a spin is valued as a vector and the dot product of adjacent spins are well defined.

FIG. 2 illustrates an Ising model in a lattice graph where a spin is valued as a vector and the dot product of adjacent spins are well defined with a spin calculated as a vector. For an Ising model, the Kronecker delta maybe defined as the dot product of adjacent spins where a spin is valued as the vector <1,0> or <0,1>. An edge between two like spins has a value of 1 as denoted by block 202 and an edge between unlike spins has a value of 0 as denoted by 204. The J is uniform throughout the graph and the Ising model Hamiltonian is represented as:

$$h(\omega) = -J \sum_{\{i,j\}\in E(G)} \sigma_i \cdot \sigma_j$$

For this state, h ($\omega$) is −14J. Ising model postulates a lattice with a spin $\sigma$ on respective sites, defining the Hamiltonian. Thus, the total energy of the spins is represented as a Hamiltonian. If J>0 then it forms a Ferromagnet where energy is lowest if many of the neighbors are in same sign. If J<0 then it forms an antiferromagnet where energy is lowest if neighbors are opposite signs. If J=0 then the interaction is non-interacting. Ising model is a widely used model in physics as it can help to represent a large number of completely different systems. This model was proposed to understand how magnetic materials work. The approach modeled a magnetic material as a collection of molecules, which has a spin which can align or anti-align with an applied magnetic field, and which interact through a pair-wise term with one another.

Figure 3:
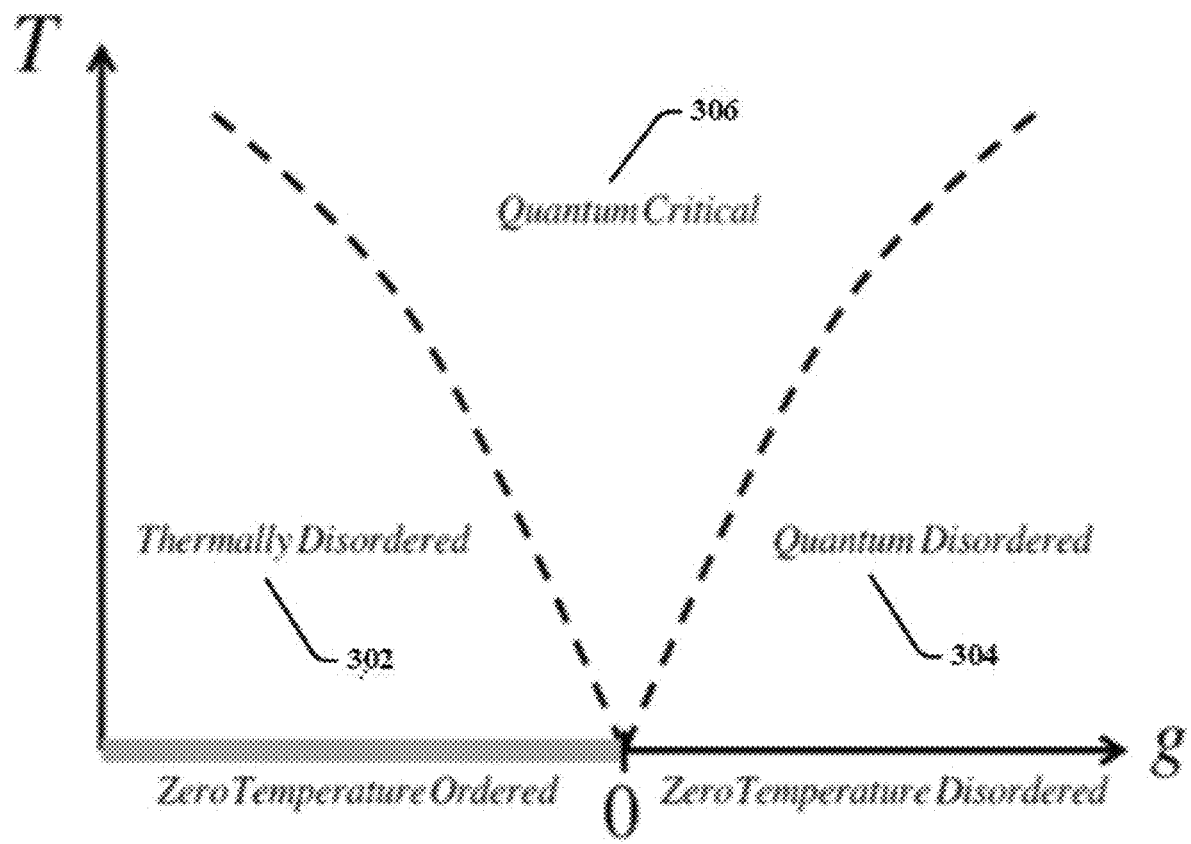
FIG. 3 illustrates an example phase diagram of a transverse-field Ising model.

FIG. 3 illustrates a phase diagram of a transverse-field Ising model. In this graph the coupling g is a measure of the transverse field strength and T is the temperature. This is one of the simplest models which exhibits a quantum critical point. Finite temperature crossovers in vicinity of a critical point can be described both for static and dynamic properties. In order to express the Ising Hamiltonian using quantum mechanics, Pauli matrices $\sigma$ can be used. However, depending on the direction of the magnetic field, a transverse-field Hamiltonian can be created as shown in FIG. 3. This is a one-dimensional Ising model with h=0. The dashed line denotes phase transitions into an ordered state when transition temperature approaches zero. At non-zero temperatures, a quantum-critical regime arises as denoted by section 306. For large g, where g>0, majority of the spins point along the direction of the transverse field (+x) in the ground state as denoted by block 304. For small g where g<0, spins are ferromagnetically aligned by exchange interactions as denoted by section 302. In the quantum critical region denoted by section 306, neither description is valid, and non-trivial scaling arguments can be used. An order is only possible at T=0 with g=0 separating an ordered phase from a disordered phase where J<0 for ferromagnet and J>0 for antiferromagnet. Thus, the transverse field Hamiltonian can be denoted by:

$$H(\sigma) = -J \sum_{i=1,\ldots,L} \sigma_i^z \sigma_{i+1}^z - h \sum_i \sigma_i^x.$$

where h is the constant external magnetic field applied to lattice sites. The transverse-field model experiences a phase transition between an ordered and disordered regime at J~h.

Quantum mechanics provides a superset of classical resources used by existing computers, and thus offers the possibility to solve certain problems faster. By processing information using the laws of quantum mechanics, Quantum computers offer novel ways to perform computation tasks such as molecular calculations, financial risk calculations, optimization and many more. In these embodiments, a technique is described for automatic generation of Ising Hamiltonians supporting optimization problems which incorporates polynomial objective function, and handles equality and inequality polynomial constraints and integer variables which can take values in contiguous and non-contiguous finite sets. In order to solve this class of problems, these embodiments also introduce a combination of techniques to reduce number of variables in the final Ising Hamiltonian. This is effectively a qubit reduction procedure. In this process, the problem is structured as a quadratic pseudo-boolean optimization problem. Techniques such as roof duality and extended roof duality are used to automatically determine optimal values of a subset of variables thus reducing number of variables in an optimization problem.

This results in an automated problem instance dependent qubit reduction procedure, which can be useful in near term for fitting optimization problems on near-term quantum computers with limited number of qubits.

In these embodiments, Ising Hamiltonian is an input given to a quantum algorithm to solve an optimization problem. Quantum computing can be used for different domains, and is a beneficial way for new computers to work but not many problems are treatable for quantum computing. In these embodiments, optimization is advised to be used as a domain where quantum computing can actually make a difference. A technique is shown to generate an input for an optimization problem so that the input is an Ising Hamiltonian problem. Number of qubits is a precious resource in today's computing world such that anything that can be done to reduce use of number of qubits is an advantage. Embodiments described and claimed herein facilitate solving an optimization problem that supports polynomial objective functions, equality and inequality polynomial constraints and integer variables which can take values in contiguous and non-contiguous finite sets. This means that variables can have values in a field of integer numbers such as negative and positive numbers, or take values such as $\{0,1,2,3\}$ and $\{10,11,12,13\}$. Moreover, qubit reduction procedure is also employed to facilitate reducing number of variables which in return reduces number of qubits required to solve the optimization problem. As near-term quantum computers have limited number of qubits available, reduction in number of qubits utilized facilitates computational efficiencies. An efficient Ising Hamiltonian is formulated followed by an automated qubit reduction procedure thus representing a class of integer optimization problem as:

$$\text{minimize} \quad f(x_1, \ldots, x_p)$$
$$\text{subject to} \quad x_i \in I_i \subset \mathbb{Z}, i = 1, \ldots, p$$
$$c_j(x_1, \ldots, x_p) = 0, j = 1, \ldots, m$$
$$d_k(x_1, \ldots, x_p) \leq 0, k = 1, \ldots, n.$$

where $f(x_i)$ is the polynomial function with a set of variables $x_1$ to $x_p$. Once an optimization problem is formulated, the optimization problem is structured as an Ising Hamiltonian. The Ising Hamiltonian becomes an input a quantum optimization algorithm. The optimization algorithms that are considered to be used are VQE/QAOA (quantum approximate optimization) algorithms. Function f has a set of constraints: domain constraints for a $x_i$, and equality and inequality constraints $c_j$ and $d_k$, where functions f, $c_j$, $d_k$ are polynomials over $\mathbb{Z}$ in integer valued variables $x_1, \ldots, x_p$. The constraint $x_i$ has variables that belong to a set of potentially disjoint interval of integers, hence it can be both contiguous and non-contiguous integers. Sets $I_i$ are finite subsets potentially non-contiguous sets of integers, for instance, if $x_1 \in \{0,1,2\} \cup \{5,6,7,8\}$ then only 0, 1, 2 and 5,6,7,8 are allowed to be part of the set.

Figure 4:
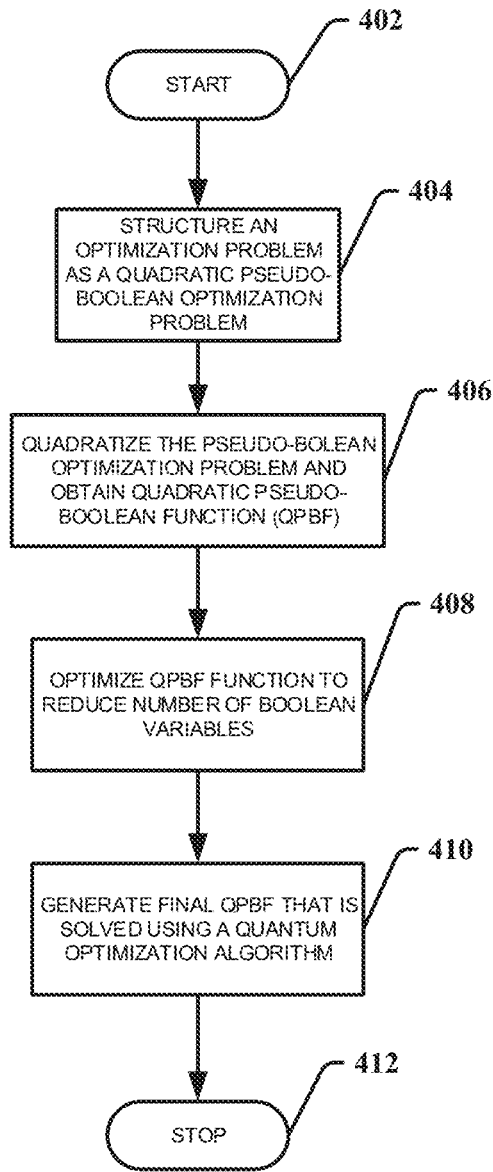
FIG. 4 illustrates an example flowchart of efficient quadratic Ising Hamiltonian generation with qubit reduction.

FIG. 4 illustrates a high-level flowchart of efficient quadratic Ising Hamiltonian generation with qubit reduction. The process begins at 402 by formulating an optimization problem as a pseudo-boolean optimization problem as denoted by block 404. Individual integer variable is determined as linear sum of binary variables. A transformation is performed to change the inequality constraint to equality constraint. An unconstrained pseudo-boolean optimization problem is generated based on the equality constraints and Quadratization is performed on the unconstrained pseudo-boolean function to generate a quadratic pseudo-boolean optimization problem as denoted by block 406. This step helps to reduce number of additional variables used to solve the optimization problem so as to generate an equivalent first quadratic pseudo-boolean function (QPBF) to optimize. Upon performing optimization on the QPBF function as denoted by block 408, the number of variables will be reduced to obtain a second QPBF with fewer number of boolean variables than the first QPBF. A final QPBF function is generated and this optimization problem can be solved using any quantum optimization algorithm as denoted by block 410 and thus completes the process at block 412.

Figure 5:
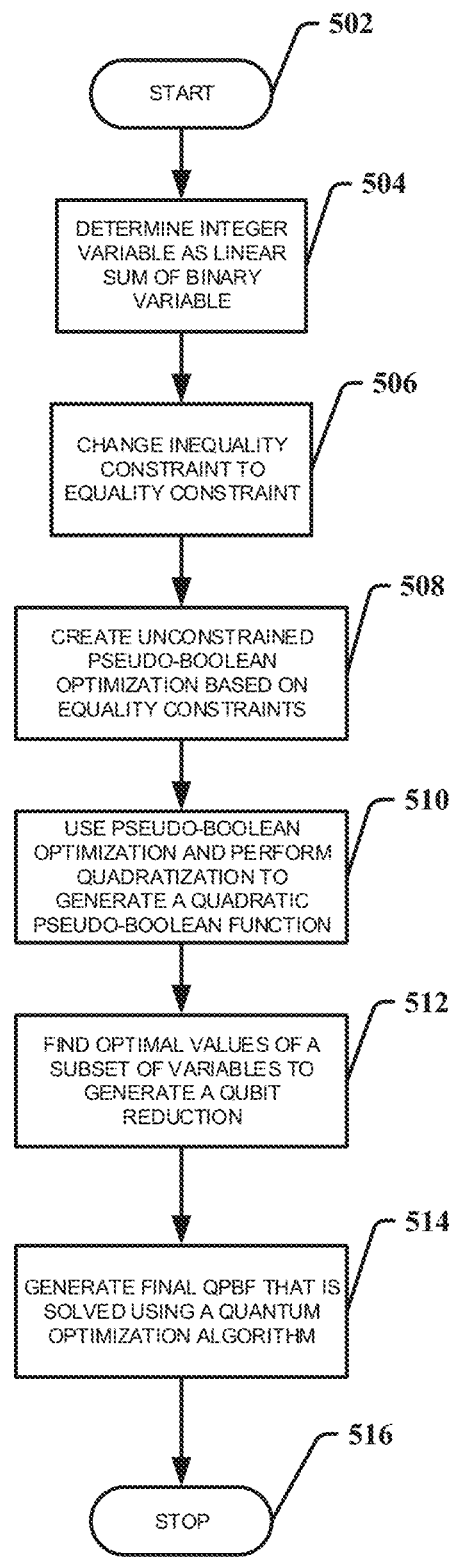
FIG. 5 illustrates an example detailed flowchart of efficient quadratic Ising Hamiltonian generation with qubit reduction.

FIG. 5 illustrates a detailed flowchart of efficient quadratic Ising Hamiltonian generation with qubit reduction. A method of efficient Quadratic Ising Hamiltonian generation for a class of integer optimization problems is performed starting from block 502 where individual integer variable is represented as linear sums of binary variables as denoted by block 504. Depending on representation, additional equality constraints might be introduced. Upon determining binary variables, additional slack variables are introduced to change inequality constraints to equality constraints as denoted by block 506. Slack variables are integer variables, that are represented using the same techniques utilized at block 502. Depending on method used, representation of integer variables may introduce additional equality constraints. An unconstrained pseudo-boolean optimization problem is created as denoted by block 508 by squaring and adding the equality constraints, with a large weight to an objective function. A large weight parameter $\lambda$ can be large such that the value of $\lambda$ chosen can be larger than a maximum value of function $f$. If values are taken over a set of finite set of points then a maximum value of this function $f$ can be found. For example, if $f$ is a polynomial function and if an absolute value of coefficients is summed up then the value of $\lambda$ is chosen such that its larger than this sum. Upon obtaining the pseudo-boolean function, quadratization is performed as denoted by 510, using best-known current techniques that minimize number of additional variables used. This provides an equivalent quadratic pseudo-boolean function (QPBF) to optimize. Upon quadratization, number of variables can be reduced in the QPBF using roof duality and extended roof duality techniques as denoted by block 512 (which have polynomial runtime). This determines values of a subset of boolean variables. Thus, a new QPBF is obtained with fewer number of boolean variables. This is also a qubit reduction step. A final QPBF that is solved using a quantum optimization algorithm such as VQE or QAOA, as denoted by block 514, thus completing the process at 516.

The methods described above provides an outline of methods in these embodiments. To initiate this process, individual integer is represented as linear sums of binary variable(s). This is a reduction step in a sense as it allows to simplify problems. In order to achieve such end, these embodiments might have to introduce additional equality constraints as well. Integer variables can be of two types, contiguous set valued and non-contiguous set valued. A contiguous integer sets assigns consecutive set of integers and hence can be sets that has no gaps such as $x \in \{5,6,7,8\}$. A non-contiguous integer sets assigns separate set of integers to a variable and hence can be sets that has values such as $y \in \{0,1,2\} \cup \{5,6,7,8\}$. These embodiments support subset of integers and that are finite sets of integers. There are various methods to encode integer variables and these embodiments are mainly focused on few encoding methods for contiguous and non-contiguous sets. Some methods to encode contiguous set values are log encoding, one hot encoding, discrete slack method and greedy decomposition method. Some methods to encode non-contiguous set values are one hot encoding and efficient encoding scheme. Upon replacing the integer variables with binary variables and potentially adding new equality constraints, these embodiments increase the number of variables, and change the type of variables involved. Earlier the functions f, cj, dk had integer variables. Upon replacing the variables, the new function has binary variables with new equality constraints and the p variables are now p' variables. The new function is represented as:

$$\text{minimize} \quad f(x_1, \ldots, x_{p'})$$
$$\text{subject to} \quad x_i \in \{0,1\}, i=1,\ldots,p'$$
$$c_j(x_1,\ldots,x_{p'}) = 0, j=1,\ldots,m'$$
$$d_k(x_1,\ldots,x_{p'}) \le 0, k=1,\ldots,n'.$$

where function $f$ has binary variables from $x_1$ to $x_{p'}$. Similarly, the constraint functions $c_j$ goes from 1 to m' and $d_k$ goes from 1 to n'. As a result of this step, the problem has been reformulated in a simplified way with the price of additional variables and constraints.

Upon completing the method above, a binary optimization problem is defined but with equality and inequality constraints. Since Ising Hamiltonians cannot be written directly for optimization problems with inequality constraints, the inequality constraints have to be transformed into equality constraint. Assuming finite precision, an inequality constraint can always be converted to an equality constraint with an additional integer variable. For instance, the inequality function $f(x) \le c$ is now converted to an equality constraint $f(x)+s=c$ by introducing a slack variable s. The function is represented as below:

$$f(x) \le c \rightarrow f(x)+s=c$$

A slack variable changes the inequality constraints to equality constraints. The function above can be further described as:

$$f(x) = \Sigma_i a_i x_1 + \Sigma_i b_i y_i$$

$$\underline{f} \le f(x) \le \overline{f}$$

where $x_i$ is a binary variable, $y_i$ is an integer variable, $a_i, b_i$ are coefficients and c is constant. s is contiguous set valued integer variable with range $[0, c-\underline{f}]$. Similarly, for the function when $f(x)$ is greater than or equal to c is now converted to an equality constraint:

$$f(x) \ge c \rightarrow f(x)-s=c$$

where slack variable s is contiguous set valued integer variable with range $[0, \overline{f}-c]$. By applying the above methods to an additional integer variable s (as in the above expressions), an inequality constraint can be transformed into an equality constraint with less additional binary variables compared to applying existing methods to the additional integer variables. The addition of extra new variables can be encoded as a binary variable using the first step mentioned in the section above and this can change the inequality constraints to equality constraint. Thus, the new optimization problem with only binary variable and equality constraints can be represented as:

$$\text{minimize} \quad f(x_1,\ldots,x_{p''})$$
$$\text{subject to} \quad x_i \in \{0,1\}, i=1,\ldots,p''$$
$$c_j(x_1,\ldots,x_{p''}) = 0, j=1,\ldots,m''.$$

The functions f, cj are polynomials in the binary variables $x_1, \ldots, x_p$. Such polynomials are also known as pseudo-boolean functions (PBF).

Figure 6:
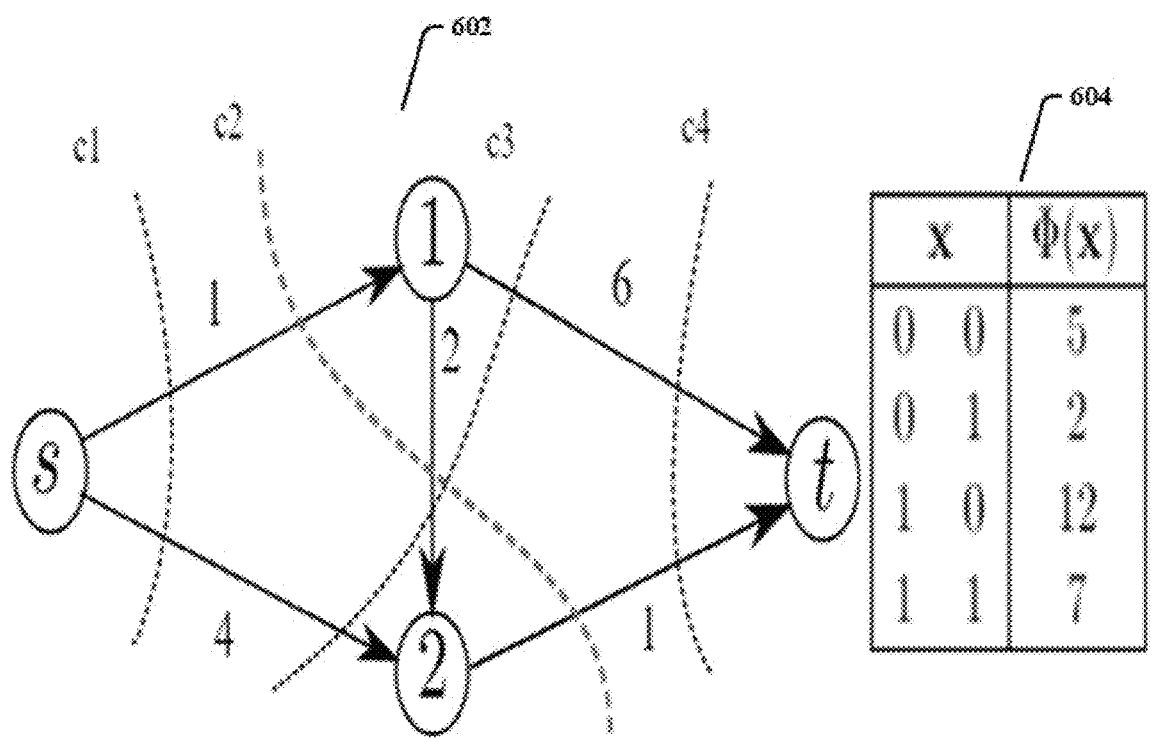
FIG. 6 illustrates an optimization example of a pseudo-boolean function.

FIG. 6 illustrates an optimization example of a pseudo-boolean function. A pseudo-boolean function is a function of the form f: $B^n \rightarrow \mathbb{R}$ where $B=\{0,1\}$ is the boolean domain and n is a non-negative integer. In an elaborated manner, a pseudo boolean function has the following form:

$$f(x_1, \ldots, x_n) = a_0 + \sum_{i=1}^{n} a_i x_i + \sum_{1 \le i \le j \le n} a_{ij} x_i x_j + \sum_{1 \le i \le j \le k \le n} a_{ijk} x_i x_j x_k + \cdots$$

where $x_n$ are Boolean variables and $a_i$ real values. For example, minimizing the sub-modular pseudo Boolean function:

$$\phi(x) = \overline{x}_1 + 6x_1 + 4\overline{x}_2 + x_2 + 2x_1\overline{x}_2$$

is the same as determining the minimum cut of the graph as denoted by block 602 where s is the source and t is the sink. An edge cut from s to $x_i$ means that the variable $x_i$ is affected to 0. Inversely, x is affected to 1 when the edge is cut from x to t. A cut is counted only if the tail is on the source side and the head on the sink side. With this formulation, a sum of an edge cut weigh is equal to cost of a pseudo Boolean function with previous affectation as shown in a truth table 604. In this example, the cut which minimizes sum of edges cost is c2 (1+1) with $x_1=0$ and $x_2=1$. This is a same label set which minimize pseudo-Boolean function $\phi$ ({1,0})=2. Upon converting inequality constraint to equality constraint in the section above, a next step is to convert optimization problem PBF into an equivalent unconstrained optimization problem. To create an unconstrained optimization problem, equality constraints are squared. Then the squared equality constraints are added to the objective function with a large weight parameter $\lambda$. There are no extra variables that are added to the problem. Such a parameter $\lambda$ always exists. The value of $\lambda$ can be large such that the value of $\lambda$ chosen can be larger than the maximum value of the function $f$. If values are taken over a set of finite set of points then a maximum value of this function $f$ can be found. For example, if $f$ is a polynomial function and if the absolute value of the coefficients is summed up then the value of $\lambda$ is chosen such that its larger than the maximum value of this function. The new objective function is now given by:

$$g(x_1,\ldots,x_{p''}) = f(x_1,\ldots,x_{p''}) + \lambda \Sigma_{j=1}^{m''} (c_j(x_1,\ldots,x_{p''}))^2.$$

and upon converting the optimization problem into an equivalent unconstrained optimization problem, an unconstrained pseudo-boolean optimization problem is created as shown below:

$$\text{minimize} \quad g(x_1,\ldots,x_{p''})$$
$$\text{subject to} \quad x_i \in \{0,1\}, i=1,\ldots,p''.$$

Thus, the function g is a pseudo-boolean function where many constraints are removed. Many application problems can be turned into such an optimization problem abound. For instance, state-of-the art methods for stereo, segmentation and image denoising are often formulated as the inference of the maximum estimate in a Markov Random Field (MRF).

These types of problems can be formulated as energy minimization problem where the energy function is given by a pseudo-boolean function. As mentioned in previous sections before, computer vision problems such as stereo, segmentation and denoising can be formulated as pseudo-boolean optimization problems. There are many methods that can be used to minimize pseudo-boolean functions of higher order than quadratic. These functions can be applied to problems in image analysis and vision. However, the problem here is that it is not a quality function such that it can have $x^3$, $x^{10}$ or $x^{14}$ type of functions. Thus, quadratization needs to be performed to optimize higher order functions via generalized roof duality or extended roof duality. Through this way, the functions that has power greater than 2 can have reduced power.

The next step involves quadratization of the pseudo-boolean function. At a high level it achieves an equivalent quadratic pseudo-boolean function (QPBF) and introduces additional binary variables into the problem. Quadratization is a process of taking a polynomial with power greater than 2 and bring the power down. This means that a higher order polynomial function is taken and reduced to equivalent minimization problem such that it's a polynomial which has a degree of 2. However, this is done by introducing additional binary variables hence the number of variables is increased when the degree of polynomial comes down to 2. Given the pseudo-boolean function $g(x_1, \ldots, x_{p''})$, its quadratization is a new quadratic pseudo-boolean function $h(x_1, \ldots, x_{p''}, w_1, \ldots, w_s)$ which has the following property:

$$g(x_1, \ldots, x_{p''}) = \min_{w_1, \ldots, w_s} h(x_1, \ldots, x_{p''}, w_1, \ldots, w_s).$$

Thus, the minimization of $g(x_1, \ldots, x_{p''})$ over $x_1, \ldots, x_{p''}$ is the same as the minimization of $h(x_1, \ldots, x_{p''}, w_1, \ldots, w_s)$ over the variables $x_1, \ldots, x_{p''}, w_1, \ldots, w_s$. Hence the quadratization step is shown where the w variables are the extra variables added and the minimization is performed accordingly. The quadratization strategy is followed by term-by-term quadratization where individual term in the equation is quadratrized separately. In this type of quadratization, the monomial term of the pseudo-boolean function is quadratized separately. When quadratizing a monomial term, a different set of new binary variables are used. Upon quadratizing, the monomial quadratization is added to obtain the quadratization of the original pseudo-boolean function. The total number of new binary variables introduced into the problem is sum of number of binary variables introduced to quadratize a monomial term. For instance, suppose the function g stated below needs to be quadratized:

$$g(x_1, x_2, x_3, x_4) = x_1 + 2x_2x_3 - x_1x_2x_3 - 3x_1x_2x_3x_4.$$

The first two terms $x_1$ and $2x_2x_3$ are already quadratized. Let $u(x_1, x_2, x_3, w_1)$ be a quadratization of $-x_1x_2x_3$ where only 1 extra binary variable is needed. Let $v(x_1, x_2, x_3, x_4, w_2)$ be a quadratization of $-x_1x_2x_3x_4$ where only 1 extra binary variable is needed as well. Then the quadratization of $g(x_1, x_2, x_3, x_4)$ is given by the quadratic pseudo-boolean function:

$$h(x_1, x_2, x_3, x_4, w_1, w_2) = x_1 + 2x_2x_3 + u(x_1, x_2, x_3, w_1) + 3v(x_1, x_2, x_3, x_4, w_2).$$

In this example, the degree of the first two polynomial $x_1 + 2x_2x_3$ is 2 but the degree of the next two polynomials $-x_1x_2x_3$ and $-3x_1x_2x_3x_4$ are 3 and 4 respectively. As the first two terms are quadratized already, the degrees of the next two polynomials need to be reduced to 2. It is to be noted that monomial $-x_1x_2x_3$ is a negative polynomial and an extra binary was added. This is the case of a negative monomial. Suppose a negative monomial $-x_1 \ldots x_n$ is present that needs to be quadratized. For a given set $S=\{x_1, \ldots, x_n\}$, the quadratization of the monomial is given by:

$$-x_1 \ldots x_n = \min_{w \in \{0,1\}} \left(|S| - 1 - \sum_{x_i \in S} x_i\right) w.$$

This quadratization scheme introduces 1 extra binary variable for individual negative monomial term. Similarly, a positive monomial $x_1 \ldots x_n$ needs to be quadratized. First two functions are defined by:

$$G_1 = \sum_{i=1}^{n} x_i, \quad G_2 = G_1(G_1 - 1)/2 = \sum_{i,j=1, j>i}^{n} x_i x_j.$$

Then the quadratization of the monomial is given in by:

$$x_1 \ldots x_n = G_2 + \left(\min_{w_1, \ldots, w_k \in \{0,1\}} \sum_{i=1}^{k} w_i(c_{i,n}(-G_1 + 2i) - 1)\right),$$

$$\text{where } k = \text{floor}\left(\frac{n-1}{2}\right), \text{ and } c_{i,n} = \begin{cases} 1 & \text{if } n \text{ is odd, and } i = k \\ 2 & \text{otherwise} \end{cases}.$$

This quadratization scheme introduces new binary variables. The number of these extra variables is approximately ½ the number of original variables in the positive monomial. $G_1$ is a linear monomial, $G_2$ is a quadratic term and n is the degree of the polynomial. Using $G_1$ and $G_2$ a positive monomial can be written. Thus, after converting both negative and positive monomial to degree 2 term, the new optimization problem with only binary variables can be represented as a quadratic unconstrained pseudo-boolean optimization problem:

$$\text{minimize} \quad h(x_1, \ldots, x_{p''}, w_1, \ldots, w_s)$$

$$\text{subject to} \quad x_i \in \{0, 1\}, i = 1, \ldots, p''$$

$$w_j \in \{0, 1\}, j = 1, \ldots, s.$$

The function h is a quadratic pseudo-boolean function (QPBF). This function can be plugged into a quantum computer at this point. The steps discussed thus far introduced the addition of extra variables in the process. Thus, qubit reduction process is introduced in these embodiments to bring the variable count down.

Figure 7:
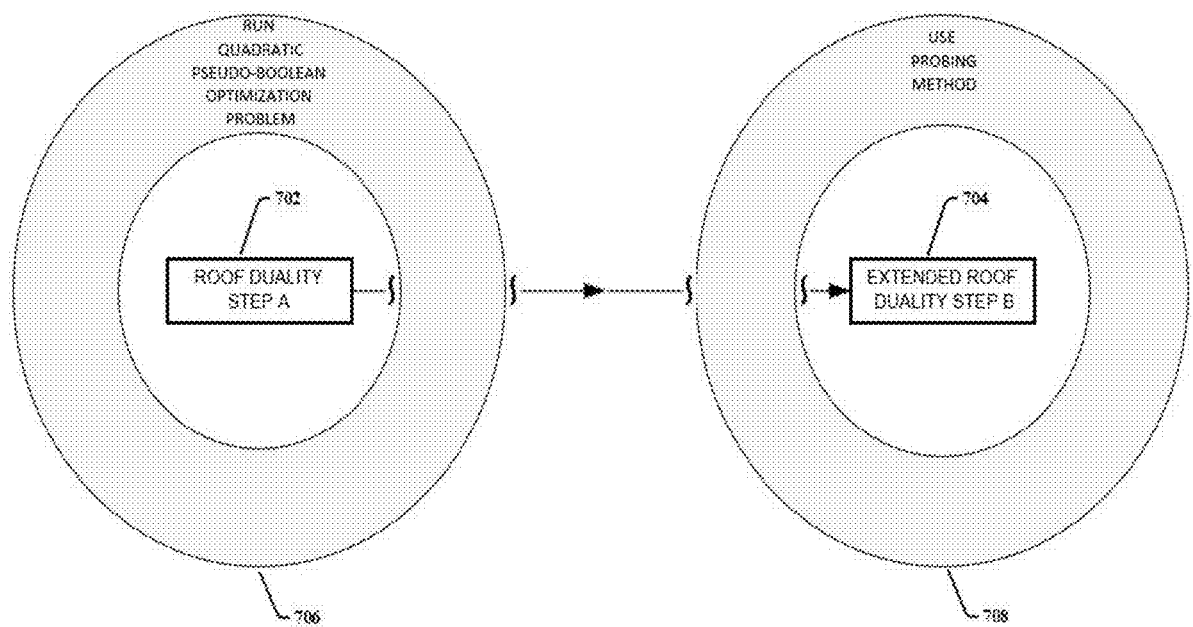
FIG. 7 illustrates an example two-step process to determine optimal values of a subset of the variables.

FIG. 7 illustrates a two-step process to obtain optimal values of a subset of variables. To determine optimal values for subset of variables, a last step involves running a polynomial time algorithm. There are two techniques: "roof duality" as denoted by block 702 and "extended roof duality" as denoted by block 704 that is used to perform optimization. Moreover, this process does not add any new binary variables to the problem. In Step A as denoted by block 702, roof duality is used to run the quadratic pseudo-boolean optimization (QPBO) algorithm as denoted by block 706. This involves solving a flow optimization problem on a graph. Through this way, a new binary optimization problem is produced with less variables. The technique works by identifying optimal values of the subset of variables. The optimal values are plugged in the objective function and a new objective function is determined with less variables. In a roof duality technique, the quadratic pseudo-boolean optimization problem can be put in one-to-one correspondence with a capacitative network, where the capacities of the edges are related to the coefficients of the QPBF. The network flow determines the optimal values and it may fix some of the variables and not fix the other variables. A max flow problem is solved using this capacitative network. The solution of this max flow problem gives rise to a cut or partition of the nodes of the capacitative network. This cut is used to infer which variables have been fixed to their optimal values using the roof duality technique. The variables that are fixed are the optimal values and these values are taken out to reduce the number of binary variables in the optimization problem. Once this reduction is completed, further reduction cannot take place in this step. This method may give one step of reduction and after one application of this step, repeated application of this method will not lead to further decrease in the number of variables. The reason this method cannot go indefinitely is because in general solving these kinds of quadratic unconstrained problems is NP-complete. Hence, these are hard problems that cannot in general be solved in polynomial time. An example is illustrated below for an unconstrained pseudo-boolean optimization problem and this problem needs to be solved using some quantum optimization algorithm. The problem is stated as:

$$\text{minimize} \quad ax_1 + bx_2x_3 + cx_1x_2 + dx_3x_4$$
$$\text{subject to} \quad x_i \in \{0, 1\}, i = 1, 2, 3, 4$$
$$a, b, c, d \text{ are integers}$$

Using the roof duality method, a capacitative network is constructed consisting of the nodes $x_1$, $x_2$, $x_3$, $x_4$, $\overline{x_1}$, $\overline{x_2}$, $\overline{x_3}$, $\overline{x_4}$, $x_0$, $\overline{x_0}$, where $x_0$, $\overline{x_0}$ are the source and sink nodes. Suppose after solving the max-flow problem on this capacitative network, the corresponding min-cut results are the source side cut $\{x_0, x_1, \overline{x_2}, x_3, \overline{x_3}\}$. and the sink side cut $\{\overline{x_0}, \overline{x_1}, x_2, x_4, \overline{x_4}\}$. This provides the following partial assignment $x_1=0$ and $x_2=1$. x1 and x2 are assigned as variables and these two variables are assigned as complements in different cuts such that the source side cut has the complement of $x_2$ which is $\overline{x_2}$ and the sink side cut has the complement of $x_1$ which is $\overline{x_1}$. Moreover, the variables $x_3$ and $x_4$ are unassigned as variables and their complement variables appear in the same cut such that source side cut has $x_3$, $\overline{x_3}$ and sink side cut has $x_4$, $\overline{x_4}$. The Ising Hamiltonian now simplifies to:

$$\text{minimize} \quad bx_3 + dx_3x_4$$
$$\text{subject to} \quad x_i \in \{0, 1\}, i = 3, 4$$
$$b, d \text{ are integers}$$

The number of qubits reduced is thus 2. Exact number of variables that can be reduced depends on the problem instance. By setting $x_1$ and $x_2$, the qubits are reduced by 2 and a simplified function is obtained by using roof duality technique. In an extended roof duality method Step B denoted by block 704, more variables can be eliminated from the problem. The techniques in an extended roof duality method is an extension of roof duality method. In these embodiments, the technique of probing as denoted by block 708 is used which is part of the extended roof duality techniques. A variable that was unlabeled in roof duality method is selected initially. This binary variable can be assigned either 0 or 1, and hence two instances of the optimization problem is created, one by fixing this variable to 0 and another by fixing this variable to 1. This can be represented as $x_1=0$ and $x_1=1$. In both cases roof duality is run and in both sub problems, and for a sub-problem new sets of variables end up getting fixed. This method is called "probing". The variables that are assigned their optimal values in both sub-problems (e.g., intersection of the variables) can be reliably eliminated from the problem. For instance, suppose that when $x_1=0$ then $x_3$ and $x_4$ got fixed and when $x_1=1$, then $x_2$ and $x_3$ got fixed. Thus, $x_3$ is fixed in both sub problems and hence it can be concluded that $x_3$ can be fixed as well. This process is repeated till no more variables can be eliminated. Upon completion of this step, the final optimization problem is generated where there is an unconstrained quadratic pseudo-boolean optimization problem, with a smaller number of binary variables represented by:

$$\text{minimize} \quad \tilde{h}(y_1, \ldots, y_q)$$
$$\text{subject to} \quad y_i \in \{0, 1\}, i = 1, \ldots, q.$$

The function $\tilde{h}$ is a quadratic pseudo-boolean function (QPBF). There are problems that can be reduced to use less qubits, and for computer vision problems, 99% of the problems can be reduced using these methods discussed above.

To solve optimization problems on limited size Quantum computers, various algorithms such as the VQE or QAOA can be used. The method mentioned in the previous sections can be applied to any quadratic Ising Hamiltonian that needs to be optimized using quantum optimization algorithms. The VQE algorithm is a quantum/classical hybrid algorithm that can be used to determine eigenvalues of a (often large) matrix. An eigenvalue is a set of values of a parameter for which a differential equation has a nonzero solution (an eigenfunction) under given conditions. This algorithm has been introduced as a hybrid quantum-classical algorithm for simulating quantum systems. Some examples of quantum simulation using VQE include solving the molecular electronic Schrödinger equation and model systems in condensed matter physics.

Figure 8:
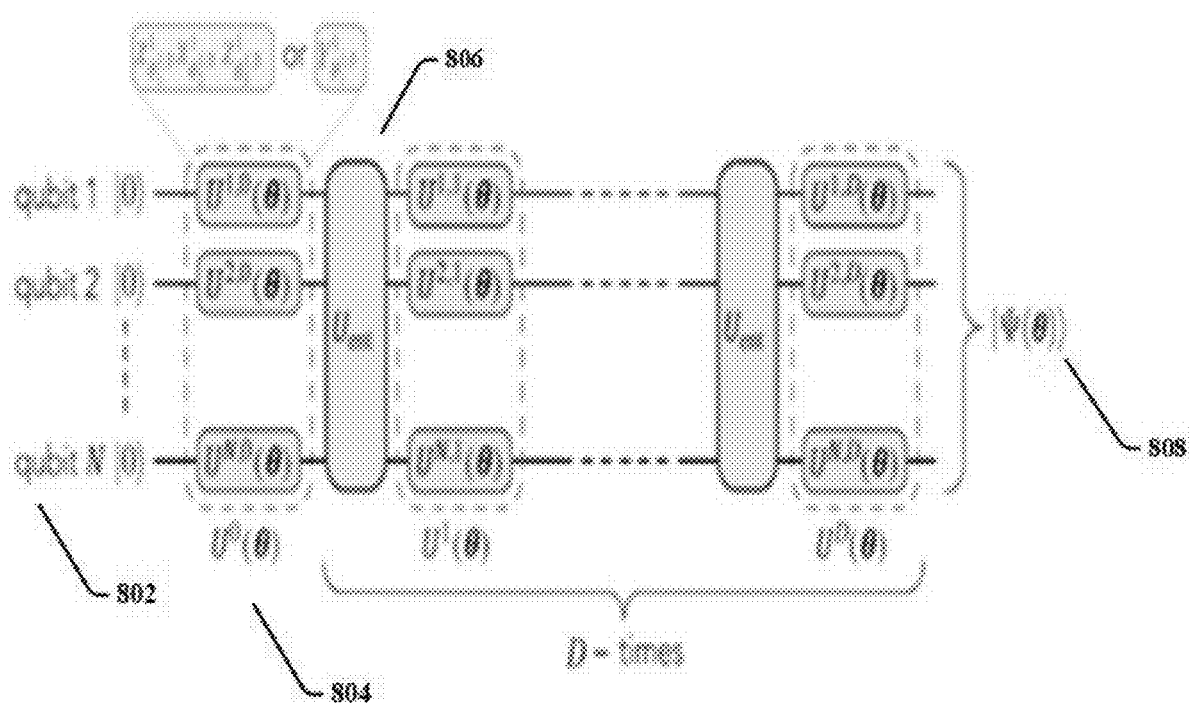
FIG. 8 illustrates an example quantum circuit for a Variational-Quantum Eigensolver (VQE) algorithm.

FIG. 8 illustrates a Quantum circuit for a VQE algorithm. The preparation of the heuristic trail states comprises of two types of quantum gates, single-qubit gate $U(\theta)$ denoted by 804 determined by the rotation angles $\theta$ and an entangling drift operation $U_{ent}$ denoted by 806 acting on pairs of qubits. The blocks in 806 are entangled to different qubits such that search can reach larger space. This algorithm is repeated D-times and the longer this process runs, the more parameters the system learns to optimize. At the end of the process, the qubits are measured and returns either a 0 or 1. Individual measurement gives a potential answer to the optimization problem. Once this algorithm runs D times with a fixed parameter such as theta in 808, then optimization can be run to obtain the best result. Through this technique, the algorithm runs a binary optimization problem into a continuous optimization problem. The QAOA algorithm is another hybrid quantum-classical variational algorithm designed to tackle combinatorial optimization problems. This algorithm depends on a positive integer p and the approximation quality is improved as p is increased. The quantum circuit that implements this algorithm consists of unitary gates and the depth of the circuit grows linearly with p times the number of constraints. If p is a fixed value, independent of the input size, then the algorithm uses an efficient method called classical preprocessing. If p grows with input size, a different strategy is proposed. These embodiments are not limited to VQE or QAOA algorithms, and any suitable algorithm can be used for quantum optimization depending on a given problem.

From a theoretical point of view, these embodiments enhance the state-of-the-art in the area of optimization by showing how to generate Ising Hamiltonians automatically for a large class of optimization problems, specifically handling polynomial inequality constraints, integer variables with values from potentially non-contiguous finite subsets of integers, polynomial constraints and polynomial cost functions. These embodiments also teach how to reduce the number of variables by using various techniques, such as casting (e.g., structuring, formulating . . . ) an optimization problem into a pseudo-boolean optimization problem, using, for example, roof duality and extended roof duality. The result presented in these embodiments is theoretically novel. It improves the usability of the quantum computing software stack by allowing practitioners working in the area of quantum optimization to quickly experiment with a quantum computer by generating the Ising Hamiltonian for an optimization problem automatically. The problem can be encoded by using a specific library such as CPLEX and DOcplex. However, other choices are possible as well. The impact of these embodiments is to augment a quantum computing stack for the optimization domain with a layer that allows practitioners to simply provide classical input (the encoding of an optimization problem in Docplex or an equivalent language), and have the stack translate that input into an Ising Hamiltonian, which is then passed as an input to a quantum algorithm (VQE or QAOA). The reduction of variables step can potentially fit larger optimization problems on near term quantum devices. Embodiments can increase portfolio of tools available in other related domains, for example of Qiskit Aqua.

Figure 9:
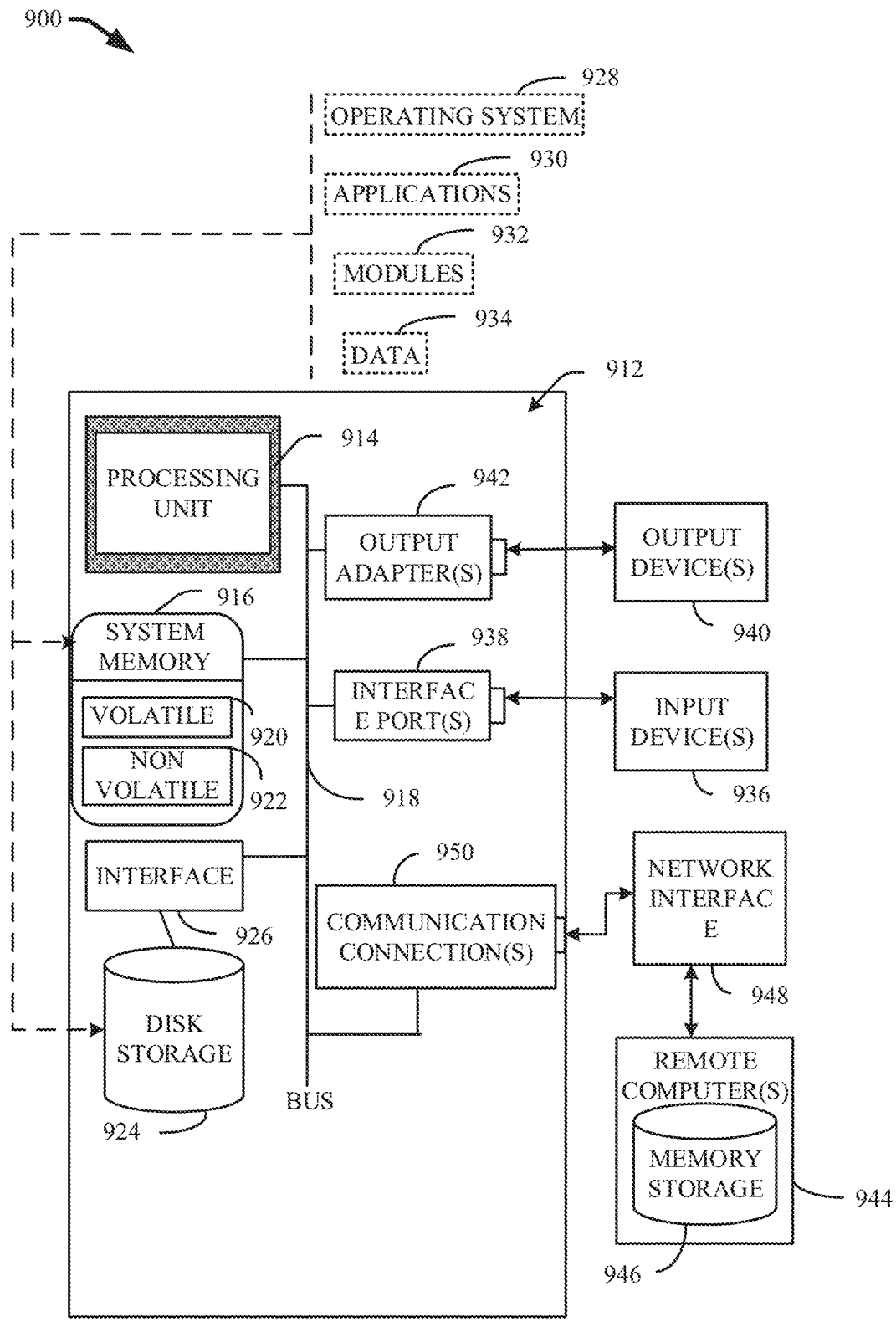
FIG. 9 illustrates a schematic diagram of an example operating environment in accordance with one or more implementations described herein.

FIG. 9 illustrates a suitable operating environment 900 for implementing various aspects of this disclosure can also include a computer 912. The computer 912 can also include a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914. The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1094), and Small Computer Systems Interface (SCSI). The system memory 916 can also include volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable programmable ROM (EEPROM), flash memory, or nonvolatile random-access memory (RAM) (e.g., ferroelectric RAM (FeRAM). Volatile memory 920 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 912 can also include removable/non-removable, volatile/non-volatile computer storage media. FIG. 9 illustrates, for example, a disk storage 924. Disk storage 924 can also include, but is not limited to, devices like a magnetic disk drive, floppy disk drive, tape drive, Jaz drive, Zip drive, LS-100 drive, flash memory card, or memory stick. The disk storage 924 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 924 to the system bus 918, a removable or non-removable interface is typically used, such as interface 926. FIG. 9 also depicts software that acts as an intermediary between users and the basic computer resources described in the suitable operating environment 900. Such software can also include, for example, an operating system 928. Operating system 928, which can be stored on disk storage 924, acts to control and allocate resources of the computer 912. System applications 930 take advantage of the management of resources by operating system 928 through program modules 932 and program data 934, e.g., stored either in system memory 916 or on disk storage 924. It is to be appreciated that this disclosure can be implemented with various operating systems or combinations of operating systems. A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port can be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It can be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a computer, a server, a router, a network PC, a workstation, a microprocessor-based appliance, a peer device or other common network node and the like, and typically can also include many or the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 950 refers to the hardware/software employed to connect the network interface 948 to the system bus 918. While communication connection 950 is shown for illustrative clarity inside computer 912, it can also be external to computer 912. The hardware/software for connection to the network interface 948 can also include, for exemplary purposes only, internal and external technologies such as, modems including regular telephone grade modems, cable modems and DSL modems, ISDN adapters, and Ethernet cards.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in one or more computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, to perform aspects of the present invention.

Aspects of the present invention are described herein with reference to flowchart illustrations and/or block diagrams of methods, apparatus (systems), and computer program products according to embodiments of the invention. It can be understood that one or more blocks of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, one or more blocks in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It can also be noted that one or more block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art can recognize that this disclosure also can or can be implemented in combination with other program modules. Generally, program modules include routines, programs, components, data structures, etc. that perform particular tasks and/or implement abstract data types. Moreover, those skilled in the art can appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not many aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a server computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings may generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random-access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products, and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor that executes the following computer executable components:
a formulation component that structures an optimization problem as a quadratic pseudo-boolean optimization problem;
a quadratization component that quadratizes the quadratic pseudo-boolean optimization problem to reduce number of additional variables used to solve the optimization problem so as to generate an equivalent first quadratic pseudo-boolean function (QPBF) to optimize; and
an optimization component that reduces number of variables in the first QPBF using at least one of a roof duality or extended roof duality technique to obtain a second QPBF with fewer number of boolean variables than the first QPBF to facilitate qubit reduction.

2. The system of claim 1, further comprising a determination component that determines an integer variable as linear sums of binary variables.

3. The system of claim 1, further comprising a transformation component that changes inequality constraints to equality constraints.

4. The system of claim 3, further comprising a computing component that creates an unconstrained pseudo-boolean optimization problem based on the equality constraints.

5. The system of claim 1, wherein the optimization component employs a polynomial time algorithm to determine optimal values of a subset of the boolean variables to facilitate the qubit reduction.

6. The system of claim 3, wherein the transformation component converts an inequality constraint to an equality constraint with an additional integer variable without loss of generality by employing:

$$f(x) \leq c \rightarrow f(x) + s = c$$

$$f(x) = \Sigma_i a_i x_i + \Sigma_i b_i y_i$$

$$\underline{f} \leq f(x) \leq \overline{f}$$

$x_i$: binary variable, $y_i$: integer variable, $a_i$, $b_i$: coefficients, c: constant
s: contiguous set valued integer variable with range $[0, c-\underline{f}]$ Similarly: $f(x) \geq c \rightarrow f(x) - s = c$ s: contiguous set valued integer variable with range $[0, \overline{f}-c]$.

7. The system of claim 4, wherein the computing component creates an unconstrained pseudo-boolean optimization problem by squaring and adding the equality constraints to the following objective function with a weight parameter:

$$g(x_1, \ldots, x_{p''}) = f(x_1, \ldots, x_{p''}) + \lambda \Sigma_{j=1}^{m''} (c_j(x_1, \ldots, x_{p''}))^2$$

8. The system of claim 1, further wherein the quadratization component introduces additional binary variables into the optimization problem.

9. A computer-implemented method comprising:
using a classical processor to execute computer executable components stored in memory to perform the following acts:
using the classical processor to structure an optimization problem as a quadratic pseudo-boolean optimization problem;
using the classical processor to quadratize the quadratic pseudo-boolean optimization problem to reduce number of additional variables used to solve the optimization problem so as to generate an equivalent first quadratic pseudo-boolean function (QPBF) to optimize; and
using the classical processor to reduce number of variables in the first QPBF using at least one of a roof duality or extended roof duality technique to obtain a second QPBF with fewer number of boolean variables than the first QPBF to facilitate qubit reduction.

10. The method of claim 9, further comprising using the classical processor to determine an integer variable as linear sums of binary variables.

11. The method of claim 9, further comprising using the classical processor to change inequality constraints to equality constraints.

12. The method of claim 9, further comprising using the classical processor to create an unconstrained pseudo-boolean optimization problem based on the equality constraints.

13. The method of claim 9, further comprising using the classical processor to employ a polynomial time algorithm to determine optimal values of a subset of the boolean variables to facilitate the qubit reduction.

14. The method of claim 9, further comprising using the classical processor to convert an inequality constraint to an equality constraint with an additional integer variable without loss of generality by employing:

$$f(x) \leq c \rightarrow f(x) + s = c$$

$$f(x) = \Sigma_i a_i x_i + \Sigma_i b_i y_i$$

$$\underline{f} \leq f(x) \leq \overline{f}$$

$x_i$: binary variable, $y_i$: integer variable, $a_i$, $b_i$: coefficients, c: constant s: contiguous set valued integer variable with range $[0, c-\underline{f}]$ Similarly: $f(x) \geq c \rightarrow f(x) - s = c$ s: contiguous set valued integer variable with range $[0, \overline{f}-c]$.

15. The method of claim 9, further comprising using the classical processor to create an unconstrained pseudo-boolean optimization problem by squaring and adding the equality constraints to the following objective function with a weight parameter:

$$g(x_1, \ldots, x_{p''}) = f(x_1, \ldots, x_{p''}) + \lambda \Sigma_{j=1}^{m''} (c_j(x_1, \ldots, x_{p''}))^2$$

16. The method of claim 9, further comprising using the classical processor to introduce additional binary variables into the optimization problem.

17. A computer program product comprising a computer readable storage medium having program instructions embodied therewith, the program instructions executable by a classical processor to cause the classical processor to:

formulate, using the classical processor, an optimization problem as a quadratic pseudo-boolean optimization problem;

quadratize, using the classical processor, the quadratic pseudo-boolean optimization problem to reduce number of additional variables used to solve the optimization problem so as to generate an equivalent first quadratic pseudo-boolean function (QPBF) to optimize; and reduce, using the classical processor, number of variables in the first QPBF using at least one of a roof duality or extended roof duality technique to obtain a second QPBF with fewer number of boolean variables than the first QPBF to facilitate qubit reduction.

18. The computer program product of claim 17, wherein the program instructions are further executable by the classical processor to cause the classical processor to: determine, using the classical processor, an integer variable as linear sums of binary variables.

19. The computer program product of claim 17, wherein the program instructions are further executable by the classical processor to cause the classical processor to: change, using the classical processor, inequality constraints to equality constraints.

20. The computer program product of claim 17, wherein the program instructions are further executable by the classical processor to cause the classical processor to: create, using the classical processor, unconstrained pseudo-boolean optimization problem based on the equality constraints.

* * * * *